United States Patent [19]
La Rose

[11] 3,858,328
[45] Jan. 7, 1975

[54] MEANS AND TECHNIQUES USEFUL IN GYROS

[76] Inventor: Russell Louis La Rose, 6111 Arrowroot Ln., Palos Verdes Peninsula, Calif. 90274

[22] Filed: Sept. 17, 1973

[21] Appl. No.: 398,151

[63] Related U.S. Application Data

Continuation of Ser. No. 138,566, April 29, 1971, abandoned, which is a continuation of Ser. No. 267,527, June 29, 1972, abandoned.

[52] U.S. Cl. .................. 33/317 D, 33/319, 74/5.46
[51] Int. Cl. ...................... G01c 17/38, G06g 7/22
[58] Field of Search ............ 33/316, 321, 317, 319; 74/5.46

[56] References Cited
UNITED STATES PATENTS

| | | | |
|---|---|---|---|
| 1,811,300 | 6/1931 | Brown | 33/321 X |
| 2,098,564 | 11/1937 | Carter et al. | 33/316 |
| 2,380,932 | 8/1945 | Bates | 33/316 X |
| 2,468,554 | 4/1949 | Hull | 33/316 X |
| 2,631,455 | 3/1953 | Wing | 33/317 X |
| 2,888,752 | 6/1959 | Lawson | 33/319 |

FOREIGN PATENTS OR APPLICATIONS

| | | | |
|---|---|---|---|
| 582,329 | 11/1946 | Great Britain | 74/5.46 |
| 940,928 | 6/1948 | France | 33/316 |
| 122,291 | 9/1959 | U.S.S.R. | 33/316 |

Primary Examiner—William D. Martin, Jr.
Attorney, Agent, or Firm—Lyon and Lyon

[57] ABSTRACT

This specification described gyros in which the spin axis is maintained in alignment with a particular direction which in some cases may be the direction of an ambient magnetic field or a component thereof. When this direction is that of an ambient magnetic field, its magnitude and polarity is used and precession in the proper direction is achieved by the automatic directional regulation of a magnet mounted on the rotor frame and lying across the rotor axis. The magnetic moment which the earth's field imparts to this magnet is directly applied to the gyro as a restoring precessional torque.

6 Claims, 6 Drawing Figures

Patented Jan. 7, 1975
3,858,328
2 Sheets—Sheet 1
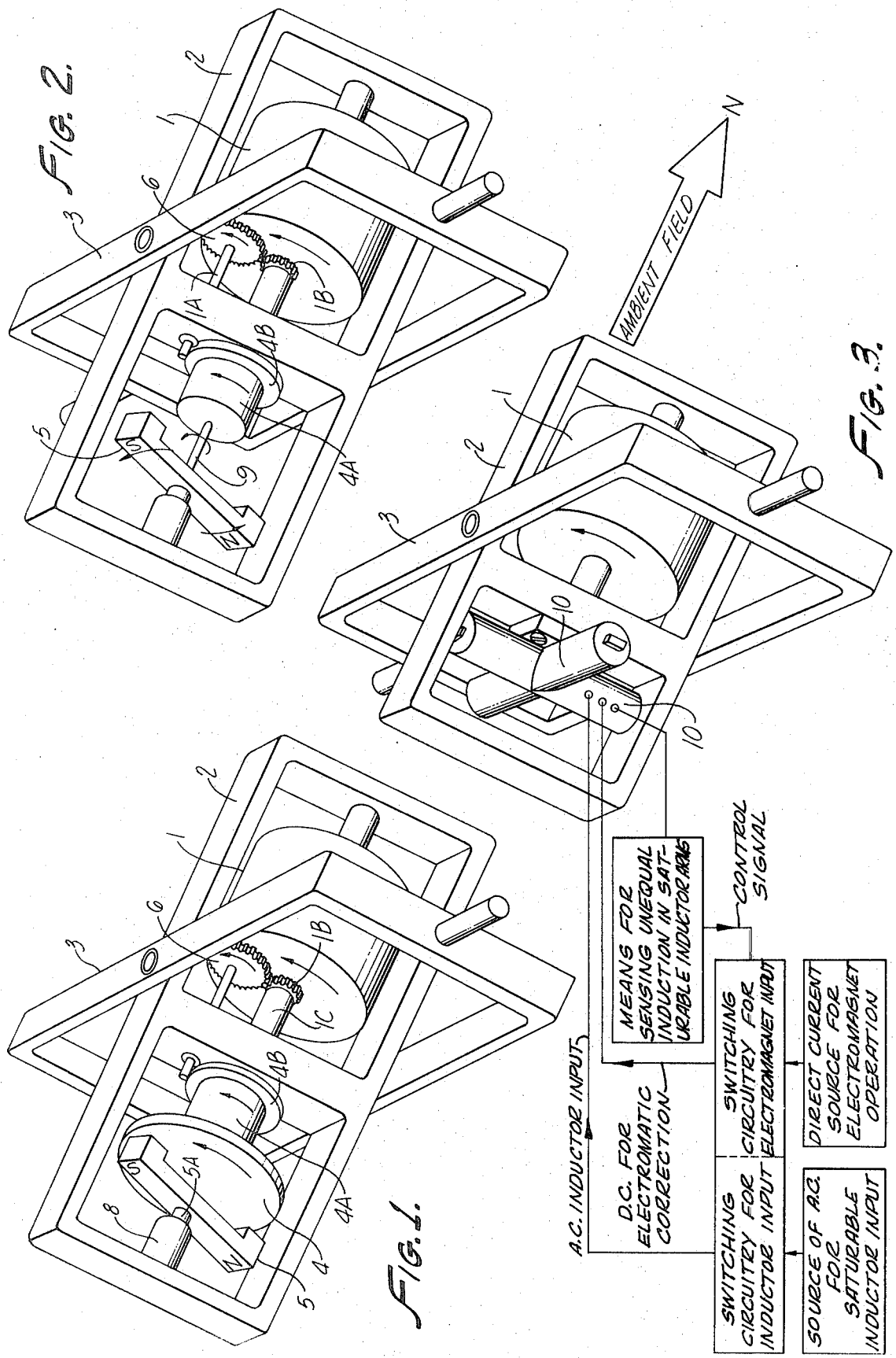

MEANS AND TECHNIQUES USEFUL IN GYROS

The present invention relates to new means and techniques useful in gyros. The present application is a continuation of my pending applications, Ser. No. 138,566 filed Apr. 29, 1971 and Ser. No. 267,527, filed Jun. 29, 1972, both abandoned.

One aspect of the invention involves an improved gyroscopic instrument which, using natural forces, will align itself with and remain aligned with the direction of the earth's magnetic field or with any magnetic field in which the instrument is placed or moved, and to the applied uses of this instrument.

The invention involves an erection system which will cause the gyro spin axis to tend to align itself with a direction representative of various conditions. When the gryoscope spin axis, through some disturbing influence, departs from alignment, magnetic balance within the instrument is disturbed and the instrument adjusts itself such that a magnetic moment is applied to the instrument in the appropriate direction such as to cause a corrective precession of the gyro spin axis, returning it to its state of alignment. One advantage of the instrument is that it is not dependent upon or affected by gravity or any accelerational forces, and is equally suited to gravity and non-gravity environments, either stationary or moving. The only external force which the instrument will respond to is a magnetic force such as an ambient magnetic field, a component thereof or a field produced which is representative of a particular direction.

Other advantages of the present invention is that a person, object, or vessel requiring an accurate navigational reference unaffected by gravity or accelerations may use the axis of this instrument directly for such reference. Also, for determining conventional magnetic azimuth, the axis of the gyroscopic instrument may be projected to a horizontal plane which is obtained from a vertical gyro, i.e., a plane normal to a vertical gyro spin axis. Such projection can be a simple optical sighting or more elaborate potentiometric or electronic pick-off devices.

Other important objects and advantages of the invention involve the use of a method of directly obtaining magnetic azimuth. This in general involves combining a gyroscopic instrument with a conventional horizontal gyroscope such that the axes of the two gyros are joined at an apex and having an angular pick-off and torqueing at this apex which is used to precess the horizontal gyro around the horizontal plane until the pick-off angle is minimum, at which instant, the horizontal gyro spin axis is aligned with the magnetic meridian. Also, by combining this instrument with a conventional vertical gyroscope, the inclination angle to the magnetic field is available for navigation or other references. In combination with both vertical and horizontal gyroscopes, complete and accurate heading and attitude information is available for navigation, attitude correction apparatus such as auto-pilots and stabilizers, and for recording and determining a vessel's progress, either by itself, by association with the known magnetic field pattern of the earth, or in combination with other navigational systems such as doppler radar and inertial platforms.

Another useful application of this instrument is in providing a directionally stable reference or platform for apparatus or instruments, such as magnetometers used in moving environments which require magnetic directional stability.

Another useful application of this instrument is in the investigation of magnetic fields. Geophysical applications include magnetic azimuth and dip angle observations and magnetic field strength observations by accurately timing precessional oscillations or erection times. An accurate method of investigating the directional change of the earth's magnetic field is to combine this gyroscopic instrument with a true north seeking gyro compass and monitor the angular difference between the two gyro axes. If this information is also combined with a vertical gyro, a complete and accurate picture is available on the directional changes of our earth's field over any monitored period of time.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGS. 1–3 illustrate one form of the present invention in which in FIG. 1, an eddy current disc is used, in FIG. 2 a torsion fibre is used and in FIG. 3 saturable inductors are used.

Figure 4:
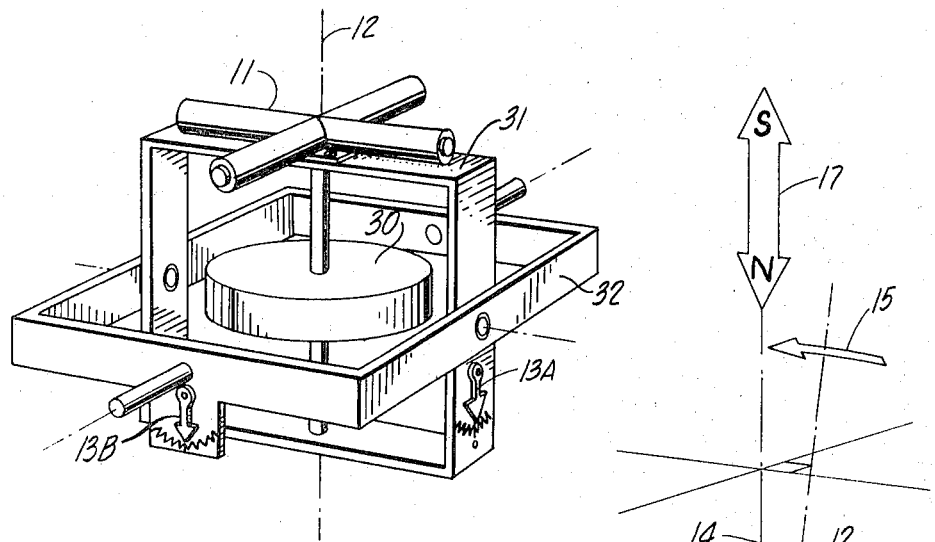
FIGS. 4–5 illustrate various positions of another form of gyro embodying the present invention like the form shown in FIG. 3

In FIGS. 1–3, the gyroscopic part of the instrument is similar and conventional involving a spin motor 1 driven electrically or by other suitable means mounted within a rigid frame 2 to which is also mounted all other mechanical tilt sensing and erection apparatus. The frame 2 may be gimballed within an outer frame as shown or may be supported in fluid, or by electrostatic or magnetic means, or by other state of the art gyroscipic support, giving the gyroscope as many degrees of freedom as desired for the purpose intended -- 1, 2 or 3, with 2° of freedom being shown in each of FIGS. 1–3.

In FIG. 1. the gyro system includes a rotating induction or eddy current disk 4 magnetically coupled to a rotating permanent magnet 5. The eddy current disk 4 is driven at a slow angular velocity either by a separate motor (not shown) or by being geared or coupled to the main spin motor, as illustrated in FIG. 1 wherein the disk 4 has a shaft 4A affixed thereto, the shaft 4A being rotatably supported on a crossmember 2A of frame 2 and having a drive flange 4B in frictional driving engagement with one end of a drive shaft 1A. This shaft 1A is rotatably supported in the crossmember and mounts a drive gear 6 which is in mesh with a smaller gear 1B on the shaft 1C of motor 1.

The rotational velocity of the disk 4 may be fixed and invariable in simple versions, or may be allowed to vary with load through a fluid or inductive coupling in more elaborate versions.

The permanent magnet 5 is free-wheeling about an axis which is the same as the rotational axis of disk 4 which is also the same or may be parallel to the axis of the spin motor 1. For these purposes the permanent magnet 5 in the form of a dipole having north and south poles at its extremities as indicated by the letters N, S is provided with a shaft 5A which is rotatably supported in bearing 8 mounted on frame 2. The magnet 5 is located close to but not touching the disk 4. As the disk 4 rotates and passes beneath the magnetic poles of the magnet 5, eddy currents are induced within the disk 4 which tend to rotate the magnet 5 along with the disk 4, following Lenz's law. When the rotational axes of the magnet 5, disk 4, and spin motor 1 are aligned with the ambient magnetic field as shown, the magnetic moment which the field exerts on the magnet is constant at every instant of rotation or position of the magnet and the magnet 5 will have no tendency to speed up or slow down and rotates at the same angular velocity as the disk 4 beneath it. Thus a constantly rotating moment of invarying magnitude under those circumstances is applied to the gyroscope causing a slight precessional nutation, although the net effect evens itself out and the spin axis remains essentially undisturbed and in alignment with the ambient field.

This action may be further explained as follows. First, consider the freely rotable magnet 5 in the absence of the eddy current disk 4 beneath it in which case the magnet 5 does not rotate but is positioned in some diametrical orientation. When the gyro axis, which is also the pivotal axis of the magnet 5, is misaligned with the ambient magnetic field vector, the magnet 5 positions itself in a line lying in a plane which extends through the gyro spin axis and the ambient magnetic vector. This is analogous to a horizontal compass needle pointing north although the actual field vector may be near vertical. Although the magnet 5 is settled in a stationary position, the ambient field continues to exert a moment on the magnet 5 attempting to turn it into complete alignment with the field. This moment, transferred to the rotor frame 2, causes the gyro to precess at right angles to the direction of misalignment but does not restore the gyro axis to alignment with the ambient field. However, when the magnet is turned 90°, then the moment transferred to the rotor frame 2 causes precession toward magnetic alignment. To achieve an effect equivalent to turning the magnet 90°, a loosely coupled drive may be employed to unevenly turn the magnet so that it turns very slowly through the quadrant where precession is desired and very rapidly through those quadrants where precession would be in the wrong direction. Such a drive is shown in FIG. 1 and involves the eddy current disk 4 which continuously and evenly turns beneath the magnet 5. When the plane of rotation of the magnet 5 is exactly normal to the ambient magnetic field vector, the moment which the ambient field applies to the magnet 5, is uniform at any position of the magnet and does not act to retard or accelerate the magnet's circular motion. In such case the magnet rotates at the same uniform rate as the eddy current disk (neglecting friction). However, when the plane of rotation tilts slightly from magnetically level (i.e., normal to the field) the ambient field has a varying effect on the magnet depending on the magnet's position. When the magnet lies in a line which is in the plane formed by the spin axis and the ambient magnetic vector, i.e., in its settling position, the ambient field exerts no torque to either retard or accelerate the magnet in which case the magnet has the same rotational speed as the eddy current disk beneath it. Similarly, when the magnet 5 is 180° from its settling position there is no torque acting to retard or accelerate the magnet, in which case the magnet also has the same rotational speed as the eddy current disk 4. However, when moving from its settling position to a position 180° around the circle, the magnet's poles encounter an uphill magnetic gradient. In this half revolution the ambient field exerts a retarding moment on the magnet which varies with the sine of the magnet's angular position of 0° to 180° from its settling orientation. This retarding moment reaches a maximum at 90° from its settling diameter or position at which point the magnet has been appreciably slowed but as the magnet continues from such 90° position to its 180° position the retarding moment diminishes until at such 180° position the retarding moment is zero and the magnet has regained the speed of the eddy current disk. Likewise from its 180° position to its 270° position the magnet encounters a downhill gradient, with the moment then acting to accelerate the magnet ahead of the eddy current disk. This acceleration reaches a maximum at 270° at which point the magnet is moving appreciably faster than the eddy current disk. The acceleration then diminishes from 270° to 360° where the magnet is again rotating at the same speed as the eddy current disk. This cycle is repeated each revolution of the magnet, with the magnet slowing throughout one-half revolution, and speeding throughout the other, never allowed to stop completely but always turning at an uneven angular rate throughout the circular path extending through the above 0° to 360° positions. When the precessional moment which the magnet 5 applies to the rotor frame 2 is evaluated such as by integrating with respect to time, the result is that over one complete circle a net resultant moment acts on the rotor to precess it toward alignment. In practice, the exact amount of slowing and speeding and thus the exact precessional direction varies somewhat, depending on the tilt angle. But for small tilt angles, i.e., less than 10° or 15°, progressive precessional direction may be within 10° to 15° of an exact restoring direction. Thus, as previously indicated, when the spin axis departs slightly from alignment, the rotating magnet 5 senses this departure, for then, as the poles of the magnet 5 progress around their circular path, they encounter a magnetic gradient which acts to slow them on their "uphill" journey and speed them on their "downhill" path. Thus, the magnet 5 no longer rotates at a constant rate, but alternately slows down and speeds up within each revolution. Were it not for the eddy current disk 4 tending to drag the magnet around at a constant rate, the magnet would eventually slow and stop, settling with the south pole of the magnet closer to the north pole of the ambient field. This tendency to settle and become stationary is overcome by the rotating eddy current disk beneath the magnet which induces the magnet to keep moving, although at a reduced speed on the magnetically uphill half revolution, and at an increased speed on the magnetically downhill half revolution. This varying progress causes the prolonged application of a magnetic moment to one side of the gyro with the net effect being a precessional torque acting to return the gyro into alignment with the ambient magnetic field, at which time, the magnet 5 returns to a uniform angular rate of rotation and precession ceases.

The arrangement in FIG. 2 embodies essentially the same principle as in FIG. 1. In FIG. 2, the magnet 5 is constantly rotated by a connecting torsion fiber 9 rather than by interaction with an eddy current disk. The torsion fiber 9 may be driven either by a separate motor or by suitable gearing and friction drive as shown also in FIG. 1. When the spin axis of the gyro is aligned with the ambient magnetic field, the angular velocity of the magnet is uniform, and the torsion fiber 9 has no twist except for that caused by the frictional resistance of the magnet. Thus, as described before, there is no corrective precessional torque applied to the gyro. When, however, the spin axis tilts from magnetic alignment, the magnet 5 tends to alternately slow down and speed up as it goes magnetically uphill and downhill respectively in its circular progress as described previously in connection with FIG. 1. The net effect is identical as that described above, i.e., a precessional torque is applied longer to one side and corrects the magnetic tilt. The torsional frequency of the fiber driven magnet mass in FIG. 2 may be made to resonate near the rotational speed of the magnet, thereby greatly exaggerating the transient oscillations of the rotating magnet, which in turn results in a much prolonged delay in the uphill leg and hastening on the downhill leg, thereby greatly increasing the correcting precession and achieving very rapid recovery to magnetic alignment.

FIG. 3 incorporates a flux valve arrangement. Here, instead of a permanent magnet, four saturable inductors 10 are arranged as equally spaced spokes in a plane normal to the gyro spin axis. When the inductor plane is perpendicular to the magnetic field, induction is exactly equal in all four arms and the electronic erection circuitry is inactive. When the spin axis tilts, the induction pattern in at least two opposite inductor arms varies with the sine of the tilt angle. This unequal induction in at least such one opposite pair of arms is sensed by appropriate circuitry, and a direct current is applied to the two other arms such as to create an electromagnet having poles which give a magnetic moment to the gyro in a direction to precess it back into alignment with the ambient magnetic field. Electronic switching circuitry alternately samples the induction in each arm with an alternating current and applies a direct durrent correction voltage where appropriate to precess out any tilt errors. This arrangement has the advantage that except for the gyro spin motor, there are no moving parts, the entire sensing and erection control being electronic in nature.

It will be seen that the electromagnet assembly 10 is attached to the rotor frame. The action of this form of the invention shown in FIG. 3 is thus essentially the same as the others, i.e., a magnet is attached to the frame and, for a greater share of time, oriented in a direction which will result in a precessional moment restoring the gyro axis to magnetic alignment. It is understood that this form of the invention is not restricted to a 4-arm saturable inductor array, but may include any electronic induction array which detects magnetic tilt. The circuitry and power supply required to send an alternating current into the inductors and to evaluate the second harmonic response is not shown and is understood to be familiar to anyone versed in the art. When the inductor array is perpendicular to the ambient magnetic field vector, there is no second harmonic response in any of the arms and erection circuitry is inactive. When the spin axis tilts, a second harmonic induction pattern is induced in at least two opposite arms and varies according to the tilt angle and direction. Standard circuitry senses this deviation and provides control currents and phase relationships proportional to tilt angle and to tilt direction. This information, i.e., tilt angle and tilt direction in an electronic form, may be used to electronically provide an electromagnet of the proper field strength, oriented 90° to the misalignment direction so that the electromagnet reacts with the ambient magnetic field to cause the desired precession, just as if it were a stationary permanent magnet. To provide an electromagnet having any direction normal to the ambient field, the same detection array 10 may be used, either using the same windings as the saturable inductor circuitry, or using additional concentric windings, or alternately, a separate electromagnet array may be used having arms lying in a plane normal to the ambient field. The same array may be used for both saturable induction and for electromagnets, in gyros of small angular momentum. When this array is used as an electromagnet, the saturable inductor excitation current is turned off, and by properly proportioning D.C. current from an external supply to each arm, an electromagnetic axis may be oriented in any direction lying in the plane of the array. By controlling the total current into the array, the strength of the electromagnet is also controlled. Since the saturable induction and electromagnet operation mutually interfere, it is desirable to alternate from one to the other. Thus, in operation, a consecutive sequence takes place. First, the electromagnet circuitry is disconnected from the array and the saturable inductor circuitry connected to the array. The A.C. excitation voltage is then applied to the excitation windings and the induction windings are monitored for the second harmonic peak value and phase relationship. This information is then fed into the electromagnet gating and control circuit. The saturable induction circuit is then disconnected from the array and the electromagnet circuit connected to the array, either to the excitation windings or to separate electromagnet windings. The electromagnet circuit, having received the signal from the induction circuit describing magnetic tilt, responds by gating an externally supplied direct current to the arms which cause precession toward alignment with the ambient field. After the electromagnet circuit has been active a sufficient time to accomplish a small increment of precession, it is disconnected from the array and the whole cycle again repeated. This switching, first to detect misalignment and then to apply magnetic precession, occurs continuously and reapidly, i.e., many times per second. Each cycle results in a readjustment of the strength and direction of the electromagnet in order to progressively eliminate misalignment with the ambient magnetic field.

Figure 5:
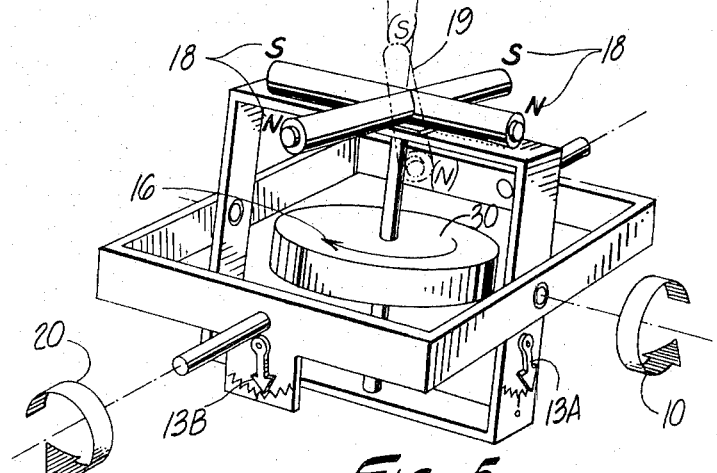
Figure 6:
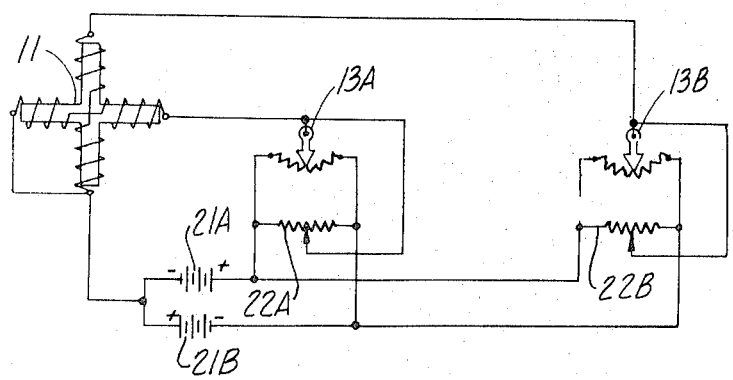
FIG. 6 is a schematic wiring diagram illustrating the manner in which the potentiometers of FIGS. 4 and 5 may be interconnected.

Additional features and capabilities of the present invention are illustrated in FIGS. 4 – 6, using the force available from the earth's magnetic field to precess a gyro. This is accomplished by positioning a magnet of proper field strength across the rotor axis of a gyro in such a manner and in such a direction that the moment applied to the magnet by the earth's field is transferred to and acts upon the gyro to cause the desired precession.

This method of gyro control shown in FIGS. 4–6 facilitates achieving precise gyro orientation and precession without dependence on gimbals and intergimbal torque and without reliance and response to gravity and accelerations and utilizes the tendency of a magnetic dipole 19 which is not aligned with the earth's magnetic field vector to align itself with that vector. The vertical component of such vector is shown at 17. The earth's field applies a magnetic moment to such a dipole and it is this moment which is applied to precess the gyro. By controlling the field strength of the magnet as for example, using the circuitry in FIG. 6, and the amount and direction of its misalignement with the earth's magnetic vector, precessional rate and direction may be accurately controlled. Since in general the earth's magnetic field has very gradual changes in direction and strength, a nearly constant or very slowly changing magnetic moment may be applied to the gyro thereby eliminating apparent drift caused by the rotation of the earth and general vehicle motion. The magnetic moment manifesting itself as the torque resulting from interaction of the earth's magnetic field with the dipole array 19 may be additionally varied in strength and in direction to correct for random drift, changes in vehicle velocity, and spurious changes in the earth's field.

The invention may be used to precess i.e., change the direction of the spin axis of a gyro in any direction. The drawing shows the invention applied to a vertical gyro wherein the spin axis is vertical (although it can be applied to gyros of any orientation).

As applied to a vertical gyro, the invention makes use of only the vertical component of the earth's magnetic field. FIGS. 4 – 6 involve an electromagnet array 11 consisting of two crossed electromagnets mounted on the gyro and having the plane of their array normal to the axis 12 of the rotor. With this type of electromagnet array, a single resultant electromagnetic dipole is created in any direction in the plane of the crossed array by properly proportioning direct current to each electromagnet as alluded to above in connection with FIG. 3. For example, by the use of standard vertical gyro sensors or pendulum pick-off devices represented by 13A, 13B it can be determined when the gyro axis 12 tilts slightly off vertical 14 as shown in FIG. 5. In this case a precession 15 to vertical is desired. When the rotor is spinning in the tilted direction shown by 16 and the vertical component of the earth's magnetic field is shown by 17 then through simple potentiometers, direct current is either manually or automatically proportioned into each electromagnet so that each has the polarity shown at 18 and together they have the resultant collective polarity as represented by an equivalent magnet 19 which is considered to be the resultant magnetic force produced by the array itself.

This resultant magnetic dipole 19 reacts with the vertical component of the earth's field, and exerts a magnetic moment or torque on the gyro having components shown at 20 causing the gyro to precess in direction 15. The rate of precession is controlled by varying the total current supplied to the electromagnet array which varies the resultant dipole magnetic moment, and the direction of precession is controlled by varying the proportion of current to each electromagnet.

One way in which these currents are controlled is shown schematically in FIG. 6 by current sources 21A, 21B and potentiometers 22A, 22B. The potentiometers 22 in a simple version may be manually controlled, and in a more sophisticated version may be computer controlled.

For these purposes it will be seen that the gyro wheel 30 spins in an inner gimbal exemplified at 31 and that such array 11 is mounted on such gimbal 31. The outer gimbal represented at 32 is provided with aligned shafts 33, 34 which are rotatably supported in bearings (not shown). One of the potentiometers 13A is mounted on the inner gimbal and the other potentiometer 13B is mounted on the outer gimbal with the wiper arm or tap of such potentiometer being in the form of a weighted pendulum pivotally supported on the corresponding gimbal.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true sprit and scope of this invention.

I claim:

1. A gyroscopic instrument whose spin axis will seek and remain substantially aligned with a particular direction comprising in combination; a gyro rotor and a rotor frame in which it is journaled; support means for cardanically supporting said frame in neutral equilibrium; means attached to the rotor frame for providing a magnetic dipole field whose axis is oriented across the rotor axis and which due to the dipole's tendency to align with the ambient magnetic field vector, applies a precessional moment to the rotor frame; means for moving the axis of the magnetic dipole field angularly throughout a circle lying in a plane across the rotor axis; the last-mentioned means being responsive to misalignment of the rotor axis with said particular desired direction and functioning to regulate the direction of the magnetic dipole field axis relative to said rotor frame so that the moment it applies to the frame is directionally related to the detected misalignment and acts to progressively precess the rotor axis in a direction to minimize misalignment with said particular desired direction.

2. A gyroscopic instrument whose spin axis will seek and remain substantially aligned with the direction of the ambient magnetic field comprising in combustion; a gyro rotor and a rotor frame in which it is journaled; support means for cardanically supporting said frame in neutral equilibrium; means attached to the rotor frame for providing a magnetic dipole field whose axis is oriented across the rotor axis and which due to the dipole's tendency to align with the ambient magnetic field vector, applies a precessional moment to the rotor frame; means for moving the axis of the magnetic dipole field angularly throughout a circle lying in a plane across the rotor axis; the last-mentioned means being responsive to misalignment of the rotor axis with the ambient field vector regulating and functioning to regulate the direction of the magnetic dipole field axis relative to said rotor frame so that the moment it applies to the frame is directionally related to the detected misalignment and acts to progressively precess the rotor axis in a direction to minimize misalignment with the ambient magnetic field vector.

3. A gyroscopic instrument whose spin axis will seek and remain substantially aligned with the direction of the ambient magnetic field comprising in combination; a gyro rotor and a rotor frame in which it is journaled; means attached to the rotor frame for providing a magnetic dipole field whose axis is oriented across the rotor axis and which, due to the dipole's tendency to align with the ambient magnetic field vector, applies a precessional moment to the rotor frame; means for moving the axis of the magnetic dipole field angularly throughout a circle lying in a plane across the rotor axis; the last-mentioned means being responsive to misalignment of the rotor axis with the ambient field vector and functioning to regulate the direction of the magnetic dipole field axis relative to said rotor frame so that the moment it applies to the frame is directionally related to the detected misalignment and acts to progressively precess the rotor axis in a direction to minimize misalignment with the ambient magnetic field vector.

4. A gyroscopic instrument as described in claim 3 having in combination an electronic induction array attached to the rotor frame to detect misalignment with the ambient magnetic field, an electromagnet array attached to the rotor frame to provide the magnetic dipole field which reacts with the ambient field to apply a precessional moment to the rotor frame, and electronic means for relating the electromagnet strength and orientation to the detected misalignment in order to achieve precession toward alignment with the ambient magnetic field vector.

5. A gyroscopic instrument as described in claim 3 having in combination a permanent magnet pivotally attached to the rotor frame and having its pivotal axis in line with the gyro spin axis, and means comprising an inductive coupling for tuning the magnet slowly so that the magnet will sense magnetic tilt and respond by turning unevenly, applying a precessional moment to the rotor frame for a longer period in the proper quadrant of rotation to effect a progressive restoring precession toward alignment with the ambient magnetic field.

6. A gyroscopic instrument as described in claim 3 having in combination a permanent magnet pivotally attached to the rotor frame and having its pivotal axis in line with the gyro spin axis, and means for turning the magnet slowly comprising a physically connecting torsional member which has a resonant frequency near its rotational speed, thereby exaggerating the uneven rotation of the magnet as it senses magnetic tilt, and causing prolonged delay in the proper quadrant to effect more rapid erection toward magnetic alignment.

* * * * *